United States Patent
Ciacci et al.

(10) Patent No.: US 9,768,985 B2
(45) Date of Patent: Sep. 19, 2017

(54) EQUALIZATION FROM PRESENCE CHANGE TRANSIENTS

(71) Applicant: NXP B.V., Eindhoven (NL)

(72) Inventors: Massimo Ciacci, 's-Hertogenbosch (NL); Ghiath Al-kadi, Graz (AT); Remco Cornelis Herman van de Beek, Eindhoven (NL); Jos Verlinden, Wachtendonk (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/006,794

(22) Filed: Jan. 26, 2016

(65) Prior Publication Data

US 2017/0214553 A1    Jul. 27, 2017

(51) Int. Cl.
*H03K 5/159* (2006.01)
*H04L 25/03* (2006.01)
*H04L 27/34* (2006.01)

(52) U.S. Cl.
CPC ........ *H04L 25/03019* (2013.01); *H04L 27/34* (2013.01)

(58) Field of Classification Search
CPC ....................................................... H04L 27/34
USPC ......................................................... 375/232
See application file for complete search history.

(56) References Cited

U.S. PATENT DOCUMENTS

| | | | | |
|---|---|---|---|---|
| 7,583,725 B1* | 9/2009 | Dick | ..................... | H04L 1/0033 375/219 |
| 2007/0253476 A1* | 11/2007 | Tirkkonen | ................ | H04L 1/06 375/230 |
| 2009/0213679 A1* | 8/2009 | Leutgeb | .................. | G11C 5/142 365/230.01 |
| 2010/0202331 A1* | 8/2010 | Zhang | .................. | H04W 52/286 370/310 |
| 2013/0064271 A1 | 3/2013 | Van De Beek et al. | | |
| 2014/0266431 A1* | 9/2014 | Chen | ..................... | H03F 1/3247 330/149 |

OTHER PUBLICATIONS

"WD 14443-2:2010/AMx—Identification cards—Contactless integrated circuit(s) cards—Proximity cards—Part 2: Radio frequency power and signal interface—Amendment x: Bit rates higher than fc/16 and up to fc" 2010.
ISO14443-3 Technical Corrigendum 1 [Jun. 3, 2013]).

* cited by examiner

*Primary Examiner* — Lihong Yu (57) ABSTRACT

An apparatus includes an antenna that is configured to transmit a radio frequency signal across a transmission media having a channel response impairment. A transmission path includes an encoder circuit that encodes data on a carrier signal; and a pre-equalizer circuit that is configured to pre-distort the encoded data according to equalizer coefficients representing the channel response impairment. A first equalization path includes circuitry that generates the equalizer coefficients based upon transients resulting from a presence change event for the carrier signal. A second equalization path includes circuitry that generates the equalizer coefficients based upon knowledge of encoded data on the carrier signal. Selection circuitry selects between the first equalization path and the second equalization path.

20 Claims, 6 Drawing Sheets

EQUALIZATION FROM PRESENCE CHANGE TRANSIENTS

OVERVIEW

Aspects of various embodiments are directed to using pre-equalization to transmit a radio frequency (RF) carrier signal using an antenna.

Various applications use inductively-coupled Radio Frequency Identification (RFID) technologies. The use of such RFID technologies has expanded from simple presence detection to more advanced applications such as electronic passports and ticketing, contactless smartcards and near field communication (NFC) in devices such as mobile phones. Some of these applications can benefit from increased data rates. Proposals to amend the International Organization for Standardization (ISO)/International Electrotechnical Commission (IEC) standard 14443 (designed for use with contactless smart cards operating at 13.56 MHz) supports data rates of several Mbit/s. With increased data rates can come increased complexity in the communication circuits.

These and other matters can present challenges to efficiencies of RFID and NFC technologies and their implementations, for a variety of applications.

SUMMARY

Various example embodiments are directed toward an apparatus that includes an antenna configured to transmit a radio frequency signal across a transmission media having a channel response impairment. A transmission path includes an encoder circuit that is configured to encode data on a carrier signal; and a pre-equalizer circuit that is configured to pre-distort the encoded data according to equalizer coefficients representing the channel response impairment. A first equalization path includes circuitry that is configured to generate the equalizer coefficients based upon transients resulting from a presence change event for the carrier signal. A second equalization path includes circuitry that is configured to generate the equalizer coefficients based upon knowledge of encoded data on the carrier signal. Selection circuitry is configured to select between the first equalization path and the second equalization path.

Certain embodiments of the present disclosure are directed toward a method for transmitting a radio frequency (RF) carrier signal using an antenna. The method includes generating the RF carrier signal while selecting a first equalization path that captures transients that occur during a presence change event for the RF carrier signal by sampling the RF carrier signal at the antenna. The method also includes generating, based upon the sampling of the RF carrier signal, equalizer coefficients that represent a channel response impairment. Data can then be encoded on the RF carrier signal using quadrature modulation. The encoded data can be pre-distorted according to the equalizer coefficients. A second equalization path can be selected that modifies the equalizer coefficients based upon a comparison between the encoded RF carrier signal at the antenna and a desired RF carrier signal. The encoded data can be pre-distorted according to the equalizer coefficients as modified by the second equalization path.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving compensating for a channel response impairment. In certain implementations, aspects of the present disclosure have been shown to be beneficial when used in the context of pre-equalization circuits. In some embodiments, the coefficients used by a pre-equalization circuit can be generated by monitoring a radio frequency (RF) carrier signal during a presence change event for the RF carrier signal. These and other aspects can be implemented to address challenges, including those discussed in the background above. While not necessarily so limited, various aspects may be appreciated through a discussion of examples using such contexts.

Various embodiments of the present disclosure are directed toward an initial calibration of an adaptive equalizer for (magnetically) inductively coupled devices. In many applications for magnetically coupled devices the distance and orientation of the antennas of the coupled devices can result in corresponding changes in the communication channel. Particular aspects allow for the initial calibration to be carried out during a presence change event for the RF carrier signal. As discussed in more detail herein, a presence change event could be a power-on event where the RF carrier signal transitions from absent to present, or a power-off event where the RF carrier signal transitions from present to absent. Particular embodiments are directed toward the use of transients in the presence change event to calculate coefficients for use in pre-equalization. In some instances, this can allow for a pre-equalization circuit to be configured without first transmitting an encoded training pattern.

Certain embodiments of the present disclosure relate to a transmitter that is configured to use adaptive pre-equalization to compensate for channel response impairments that can cause channel bandwidth limitations. In a feedback configuration, the transmitted waveform is available at the transmit (TX) antenna pins and can be demodulated and analyzed in order to adjust the coefficients used by a pre-equalization circuit. This creates a loop that causes the pre-equalized signal to conform to a desired response signal, which meets signal shaping criteria for the targeted data rate. In effect, the pre-equalization can act as a filter that has approximately the opposite complex frequency response of the channel, thereby cancelling out at least some of the channel response impairment. In this way the desired signal shaping can be obtained without the cost of dampening the TX antenna, which can negatively affect power efficiency.

When a transmitter begins transmitting, it may have no actual knowledge of the channel. Thus, at start up an adaptive pre-equalizer will seek to acquire the channel information, in the form of equalizer coefficients. In some instances, the initially acquired channel information can be obtained using a training pattern of some sort, such as a specific start of communication pattern. The feedback loop can generate an error based upon a mismatch between the desired response signal and the actual signal and the equalization coefficients can be generated therefrom. Various aspects of the present disclosure are based upon the recognition that training patterns can cause problems in certain systems. For example, an enabled receiver might detect the modulation corresponding to the training pattern as a transmitted frame with actual data. As a more specific example, the receiver might interpret the training pattern as an unexpected modulation from an unknown device and cancel any ongoing transmission. Without the use of a training pattern, data can be lost because the encoded data will begin transmitting with poor knowledge of the channel characteristics. While adaptive feedback loops can eventually compensate for channel impairments, it might take multiple iterations to reach an acceptable compensation level during which time the receiver may not be able to decode the data properly. Accordingly, embodiments of the present disclosure are directed toward using the transient of the RF carrier signal as it is presented to, or removed from, the antenna. This allows for a relatively accurate estimation of the channel impairment and for the corresponding equalizer coefficients.

Various aspects of the present disclosure can be particularly useful in an active-to-active NFC system where the magnetic RF field is switched on by one requesting device, and then off again, until the responding device in turn switches on its own field. In this case, each device can observe power-on transient at its respective antenna to calibrate a respective pre-equalizer circuit.

Consistent with the discussion herein, the initial calibration can be followed up by the use of an adaptive feedback pre-equalization loop. To transition between the two different adaptive pre-equalization mechanisms, the transmitter device can be configured with two different equalization paths. Selection circuitry can be configured to select between the equalization paths.

Various embodiments are directed toward a communication device that includes a transceiver circuit that is configured to communicate by generating an RF carrier signal of around 13.56 MHz as consistent with various RFID technologies, such as ISO/IEC standard 14443. In certain embodiments, the transceiver circuit can be configured to communicate using active-to-active communications with another transceiver circuit that is also configured to generate an RF carrier signal of around 13.56 MHz. Particular embodiments are directed toward the transceiver circuit using an unmodulated version of the RF carrier signal to initiate the active-to-active communications by initializing pre-equalization coefficients using power-on or power-off transients created when the RF carrier signal is first transmitted and when transmission is stopped, respectively.

Figure 1:
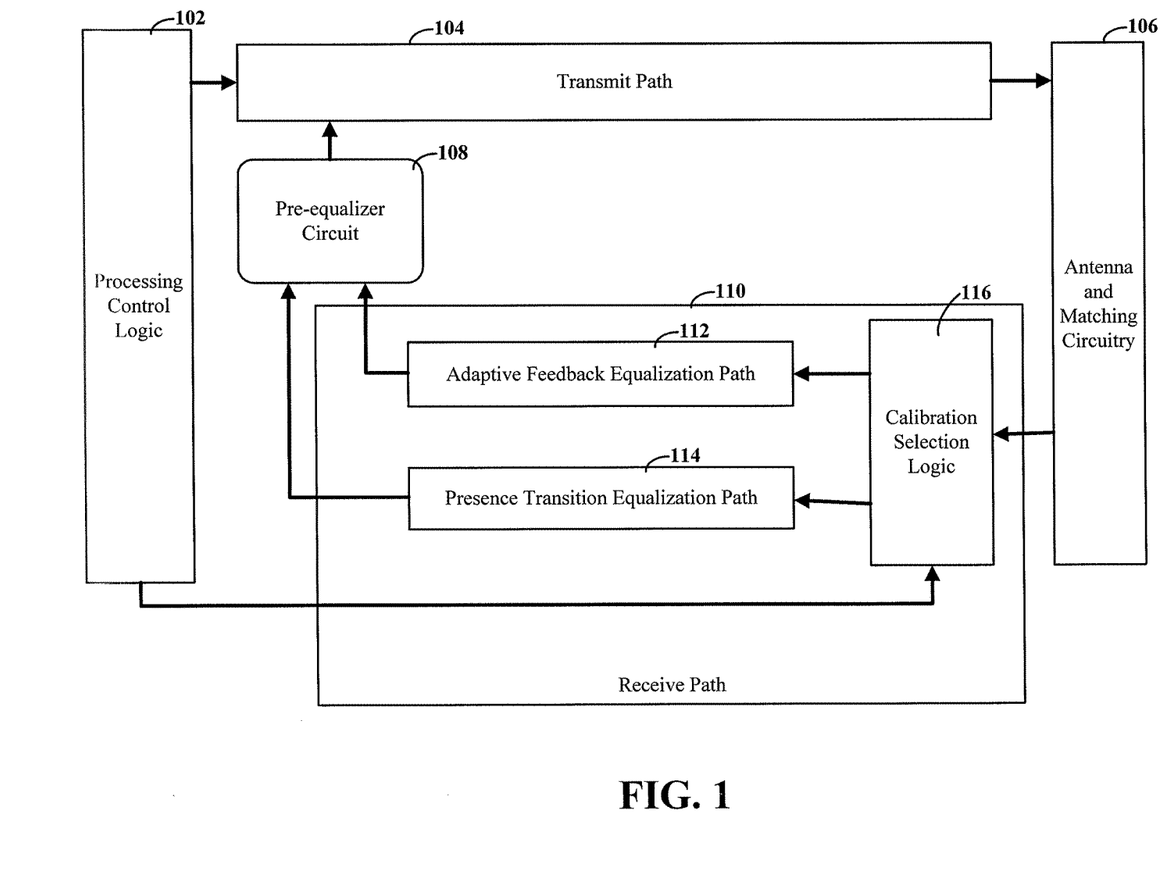
FIG. 1 depicts a block diagram for a transmitter device, consistent with embodiments of the present disclosure.

Turning now to the figures, FIG. 1 depicts a block diagram for a transmitter device, consistent with embodiments of the present disclosure. The transmitter device can be configured to transmit an RF carrier signal (which can be modulated to encode data) to a remote device using antenna and matching circuitry 106. In particular embodiments, the antenna and matching circuitry 106 can be configured to transmit the RF carrier signal using magnetic coupling with the remote device using NFC (e.g., as consistent with various RFID technologies). Pre-equalizer circuit 108 can be configured to introduce a pre-distortion to the RF signal in order to counteract, and mitigate for, distortions caused by channel response impairment.

Processing and control logic can provide data to the transmit path 104. Transmit path 104 can be configured to encode the received data on to an RF carrier signal that is then transmitted using the antenna 106. For instance, the transmit path can include circuitry that is configured to generate a modulated signal at baseband and then up-convert the modulated signal to an RF frequency. For example, the modulation could be a form of quadrature modulation; however, other modulation techniques are also possible.

The transmitter device can also include a receive path 110. The receive path 110 can be connected to the antenna 106 and provide one of two return paths for generating coefficients used by the pre-equalizer circuit 108. Processing control logic 102 can be configured to select between these paths by controlling the operation of calibration selection logic 116. For instance, the transmitter device can be configured to select a first path to adaptively initialize the coefficients before data is transmitted and a second path to continuously adjust the coefficients while data is being transmitted. More particularly, the processing control logic 102 can be configured to select the presence transition equalization path 114 when there are presence change events for the RF carrier signal (e.g., events corresponding to when the RF carrier signal transitions between being present and being absent on the antenna 106). Once data is being transmitted, with pre-equalization using the coefficients generated by path 114, the processing control logic 102 can select the adaptive feedback equalization path 112, which can include logic circuitry that is configured to continuously adjust the coefficients based upon feedback received from the antenna relative to the updated coefficients.

Consistent with embodiments of the present disclosure, the presence transition equalization path 114 can include circuitry that is configured to generate the equalizer coefficients based upon transients resulting from a presence change event for the carrier signal. The transients can be detected by measuring the complex envelope of the signal seen on antenna 106. For example, the processing control logic 102 could be configured to carry out a presence change event by providing the RF carrier signal to the antenna according to a step function (e.g., from "0" to "1"). The presence transition equalization path 114 could take multiple sample points that are used to identify deviations from the desired step function. For example, a least square regression analysis could be applied to samples of a complex envelope for the RF carrier signal. The results of the analysis can then be used to approximate the channel impairment and to determine the corresponding coefficients for mitigating the impairment.

In particular embodiments, the transmitter device can also receive data and thereby function as a transceiver. In such embodiments, the receive path 110 can include circuitry for down-converting the received signal before determining the coefficients (in path 112 or path 114). To save on resources, power and cost, this circuitry can be shared with the equalization paths. Thus, the same circuitry can down-convert the received signal whether the signal is to be provided to the adaptive feedback equalization path 112, the presence transition equalization path 114, or a data reception and decoding path (not expressly shown). Moreover, it is recognized that the data reception and decoding path can be used in combination with the other paths. For example, the adaptive feedback equalization path 112 can be used to generate and update the coefficients while data is being actively received and decoded for use by the processing control logic 102.

Figure 2:
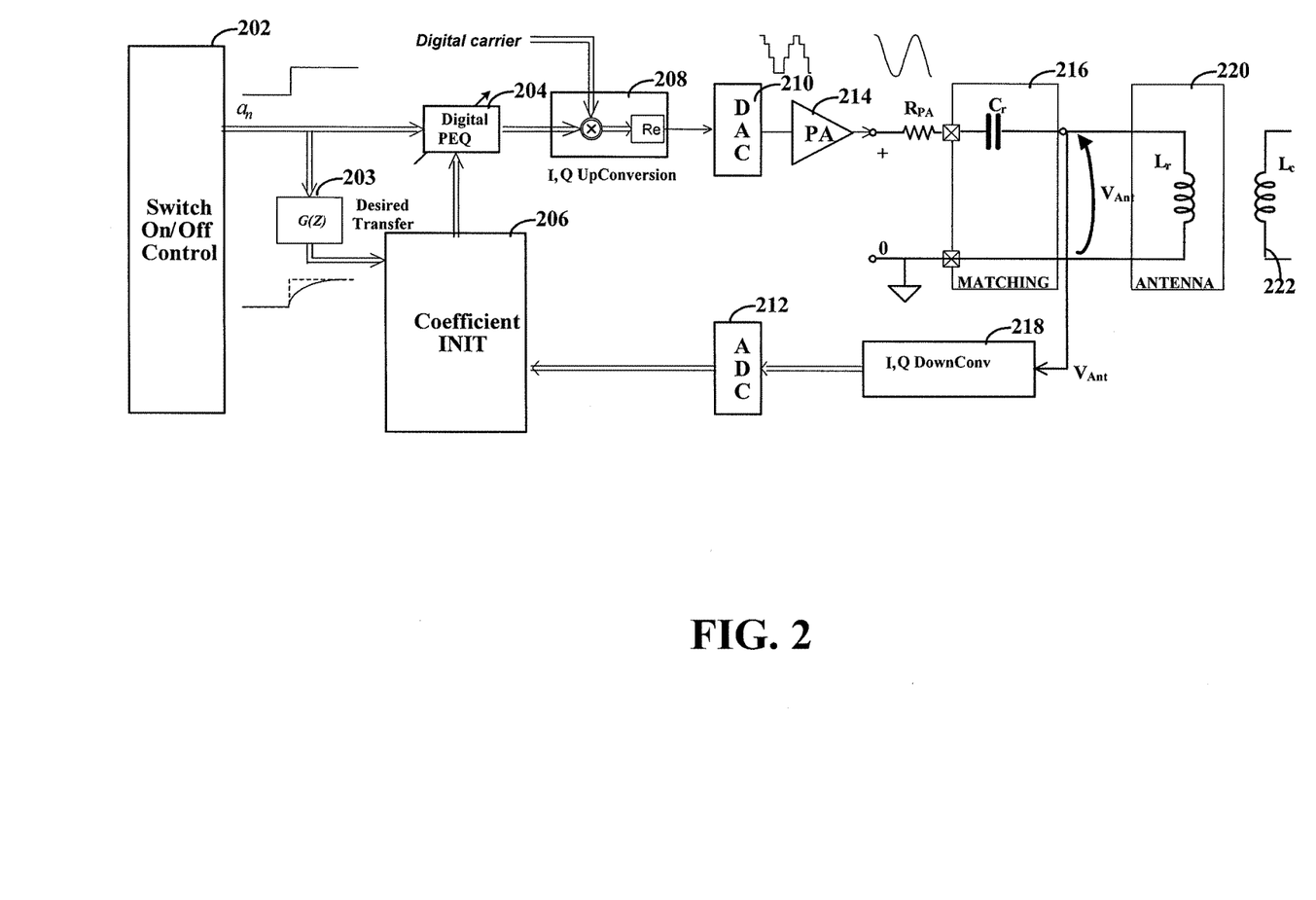
FIG. 2 depicts a block diagram that includes a presence transition equalization path, consistent with embodiments of the present disclosure.

FIG. 2 depicts a block diagram that includes a presence transition equalization path, consistent with embodiments of the present disclosure. The various components of FIG. 2 can be consistent with the discussion of FIG. 1. The similar components can serve as, non-limiting, examples thereof. For instance, switch on/off control circuit 202 can be controlled by, or be part of, processing control logic, such as the processing control logic 102 discussed in connection with FIG. 1. The diagram of FIG. 2 represents an example of how a transmitter can operate while selection logic circuitry has been set to enable a presence transition equalization path.

Consistent with embodiments, switch on/off control circuit 202 can be configured to create presence change events for the RF carrier signal by providing and removing the RF carrier signal at the antenna 220, which is configured to magnetically couple with a remote antenna 222 of another device. For a power-on event, the switch on/off control circuit can provide an input signal $a_n$ that is shown as a step response from no signal to the full signal. Digital pre-equalizer (PEQ) circuit 204 can be configured to introduce a distortion to the input signal to compensate for channel impairment. At power-on little or no information may be known about the channel. Accordingly, the digital PEQ circuit 204 can be initially configured with no distortion. In some embodiments, the digital PEQ circuit 204 can be initially configured with a distortion that is based upon a corresponding set of coefficients. The initial distortion could be set based upon a default value stored in a local memory circuit, a value based upon a previous communication cycle, or from another source. In the case where there is some pre-equalization distortion, the coefficient initialization circuit 206 can be configured to take this pre-equalization into account. For example, the output of the coefficient initialization circuit 206 can be a relative adjustment to the existing coefficients (which could be either zero or some nonzero initial/default value).

Up-conversion circuit 208 can be configured to convert the input signal to a desired carrier frequency and to introduce modulation corresponding to any data contained in the input signal. Consistent with various embodiments, a presence change event for the RF carrier signal means that the RF carrier signal is in a transitional state and that data is not being transmitted. Thus, the up-conversion circuit 208 would not introduce additional modulation during the transition period. As a particular, non-limiting example, the up-conversion circuit 208 can be configured to use quadrature modulation (I and Q) to encode data onto the digital carrier frequency. A digital-to-analog converter (DAC) 210 can be configured to create an analog signal from the digital signal provided by the digital PEQ 204. A power amplifier (PA) circuit 214 can be used to increase the power of the analog signal so that it can drive the antenna 220 with sufficient strength. A power resistor ($R_{PA}$) can be used and the corresponding output can be a smoothed version of a quantized output signal from the DAC 210, as shown by the waveforms directly above the respective circuits. In certain implementations, a matching circuit 216 can be configured to provide impedance matching between the PA circuit 214 and the antenna 220. The matching can take into consideration the properties of the antenna, such as the inductive value $L_r$, as well as the expected loading from the remote antenna 222, which can include its inductive value $L_c$. The depicted example uses capacitive ($C_r$) coupling to help achieve this matching.

Down conversion circuit 218 can be configured to demodulate a feedback from the signal present on the antenna 220 to provide a complex baseband signal. The depicted example again uses quadrature (I and Q) modulation; however, other modulation solutions are also possible. The analog to digital converter (ADC) 212 can then sample the output of the down conversion circuit 218 to capture transients occurring in response to the presence change events for the RF carrier signal. For quadrature modulation schemes, the sampling can include both I and Q components of the demodulated signal. The coefficient initialization circuit 206 can be configured to use the digital samples from the ADC 212 to generate a set of coefficients that can be loaded into the digital PEQ circuit 204. Desired transfer function block 203 can be configured to apply a desired transform (G(Z)) to the input signal $a_n$. The resulting output represents the desired channel response to the presence event that corresponds to the input signal provided by the switch on/off control circuit 202. The coefficient initialization circuit 206 can compare the sampled values to the desired values indicated by the desired transfer function block 203. A detected difference can be represented as an error signal that can then be used to determine coefficients that correspond to a pre-distortion that would mitigate the detected difference.

According to certain embodiments, the time when the digital PEQ circuit implements the pre-distortion for the initial coefficients can vary according to the particular implementation. For example, the coefficients can be immediately provided to, and used by, the digital PEQ circuit 204. In another example, the use of the coefficients by the digital PEQ circuit 204 can be delayed until data is being transferred. This delay could be useful for avoiding dampening of the unmodulated RF carrier signal due to the pre-distortion. As data is not being transmitted by the unmodulated RF carrier signal, the distortion can be delayed without increasing the potential loss of data.

The number of samples that are taken can vary according to the particular application and capabilities of the ADC 212. For instance, a power-on presence change event might take two samples while the power-on/off transient is still present. For a power-on transient, a third sample can also be taken once the transient has settled to a steady state condition. The number of samples taken during the power-on/off transient can be increased with a limitation being the sampling rate capabilities of the ADC 212 relative to the time period that the transient is present.

Figure 3:
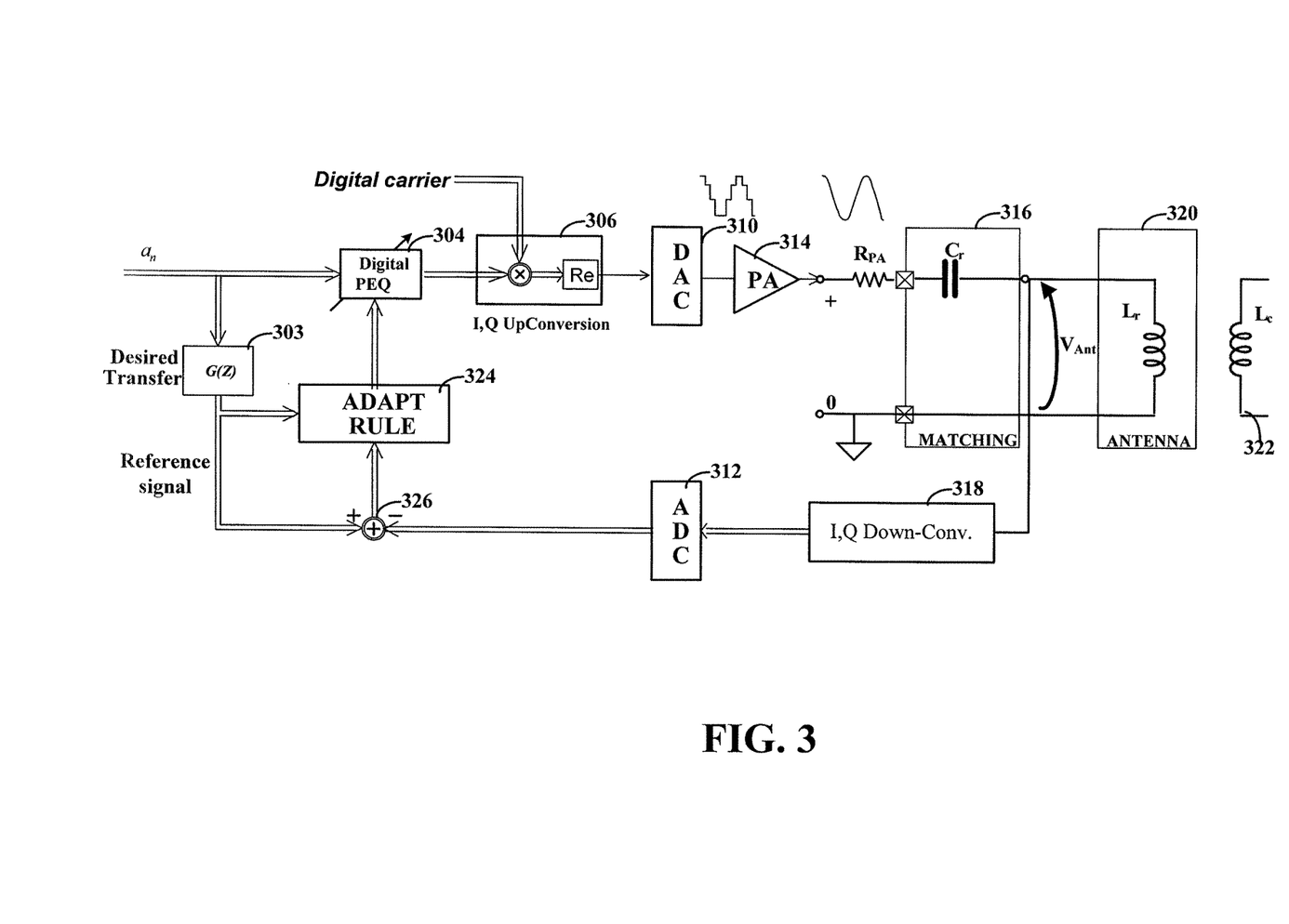
FIG. 3 depicts a block diagram that includes an adaptive feedback equalization path, consistent with embodiments of the present disclosure.

FIG. 3 depicts a block diagram that includes an adaptive feedback equalization path, consistent with embodiments of the present disclosure. The various components of FIG. 3 can be consistent with the discussion of FIG. 1. The similar components can serve as, non-limiting, examples thereof. Moreover, several elements of FIG. 3 can have similar, or even identical, functions to corresponding elements from FIG. 2. In this context, similar numbers (e.g., 204 and 304 are similar) can indicate similar functionality. Moreover, various embodiments allow these elements to be implemented as the same element within a larger device, such as the device depicted in FIG. 1. This can include a single set of the similar elements 204-222 and 304-322, with selection logic selecting between the remaining components from each respective figure: the coefficient initialization circuit 206 vs. the adapt rule circuit 324 and the mixer 326. In this context, the diagram of FIG. 3 represents an example of how a transmitter can operate while selection logic circuitry has been set to enable an adaptive feedback equalization path. In the interest of brevity, the specific functions of elements 304-322 are not repeated in their entirety relative to the corresponding discussion of FIG. 2.

The input signal $a_n$ contains data for transmission using the antenna 320. This data can be provided after a power-on presence event has occurred and after corresponding initial coefficients are generated, as is discussed herein in connection with FIGS. 1 and 2. The presence of data results in corresponding modulation to the RF carrier signal. The modulation creates transients that can then be used to identify and characterize the channel response impairment. Accordingly, the adaptive feedback equalization path can be configured to continuously monitor the channel response and adjust the equalizer coefficients. In particular embodiments, the digital output of the ADC 312 is compared with the output of the desired transfer function block 303 to produce an error signal that is provided to the adaption rule circuit 324. The adaption rule circuit 324 can then adjust the coefficients based upon the determined error. This process can repeat so that the error converges toward zero so as to reduce unwanted distortions caused by the channel response impairment. Repeating the process can also allow for adjustment due to changes in the system, which might include changes to the relative positioning of the antennas 320 and 322.

Figure 4:
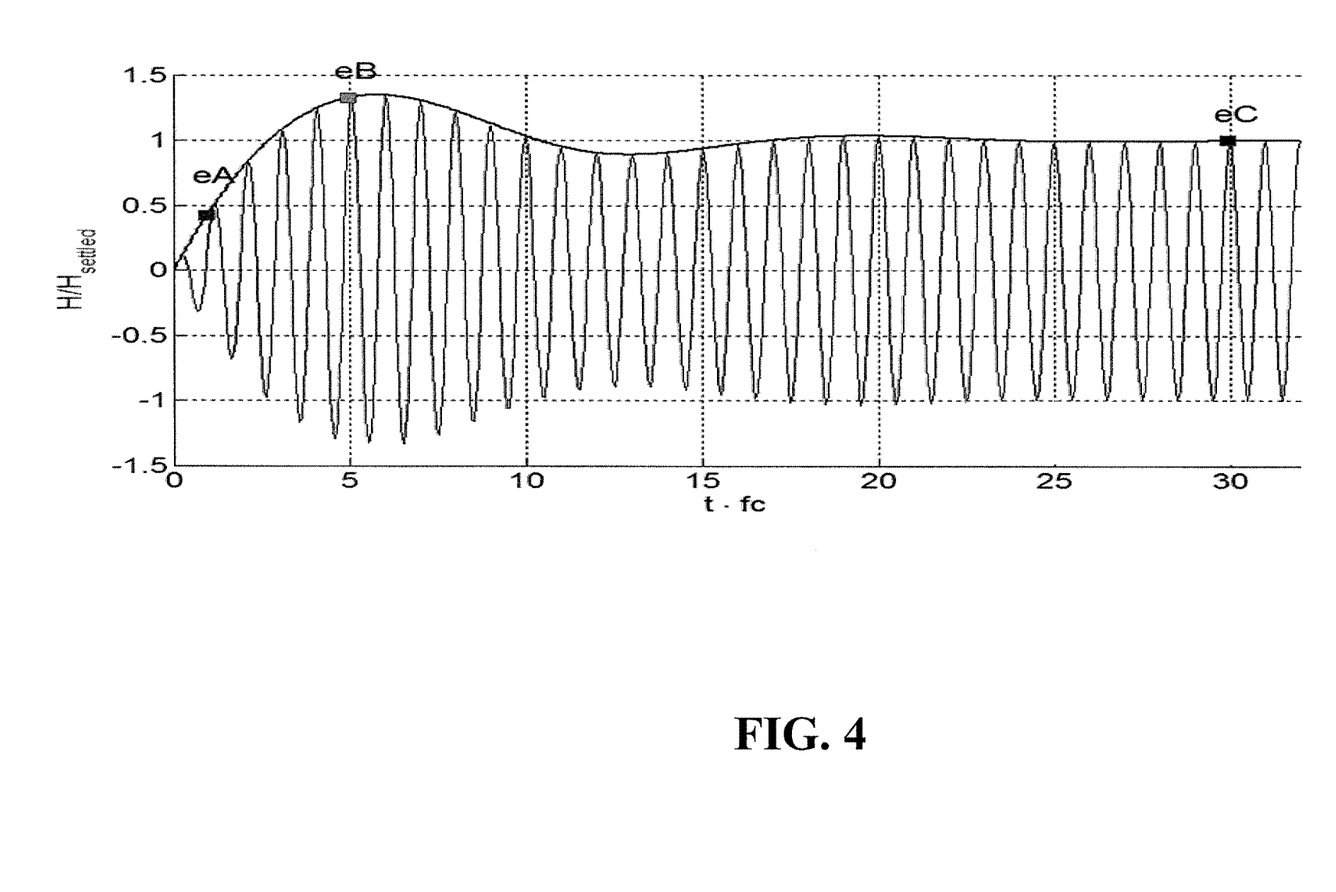
FIG. 4 depicts a waveform of a complex envelope for a power-on event, consistent with embodiments of the present disclosure.

FIG. 4 depicts a waveform of a complex envelope for a power-on event, consistent with embodiments of the present disclosure. The waveform shows an example for complex envelope that occurs when an unmodulated RF carrier signal is introduced to an NFC capable antenna. The units of the vertical axis represent the complex envelope as normalized relative to the steady state condition for the carrier wave ($H_{settled}$). The horizontal axis represents time as a function of the RF carrier signal frequency $f_c$, where each unit is one period. The labelled points eA, eB and Ec represent complex envelope values at three different sample points in the complex baseband. As depicted, each of eA and eB are sampled before the complex envelope has settled and while the power-on transient is still present, while eC is taken after the complex envelope has settled to a steady state value. The specific timing for the sample points is somewhat arbitrary and can be different depending upon the particular application. For instance, multiple sample points can be taken during the transient period for the presence change and a subset of the sample points can be selected for use in determining the coefficients. As one example, the two sample points during the transient period can be selected such that they have the largest difference in sampled values relative to other combinations of sample points. In some instances, values for more than two sample points within the transient period can be used to generate three or more coefficients. The coefficients can then be used in combination with a pre-equalizer filter function of higher than first order.

For ease of discussion, the following example is discussed in connection with a desired transfer function where G(Z)=1 and where the pre-equalizer filter function is of first order with two coefficients and a single zero. In a particular example, the first two sample points (eA, eB) can be taken at a rate selected based upon the pre-equalizer filter. This rate can be based upon the rate at which the channel poles are implicitly calculated. The third point can be taken at a much later time to be sure that the transient has settled, which can be determined as a function of the quality maximum and RF carrier frequency, e.g. at a time $t>1.5*Q_{MAX}/f_c$. A two tap equalizer based on this power-on transient can use coefficients W0 and W1 that are defined by: W0=(eC−eB) and W1=−(eC−eA). It is noted that the two-dimensional graph of FIG. 4 does not show the polarity for the complex envelope and the resulting sample values.

Figure 5:
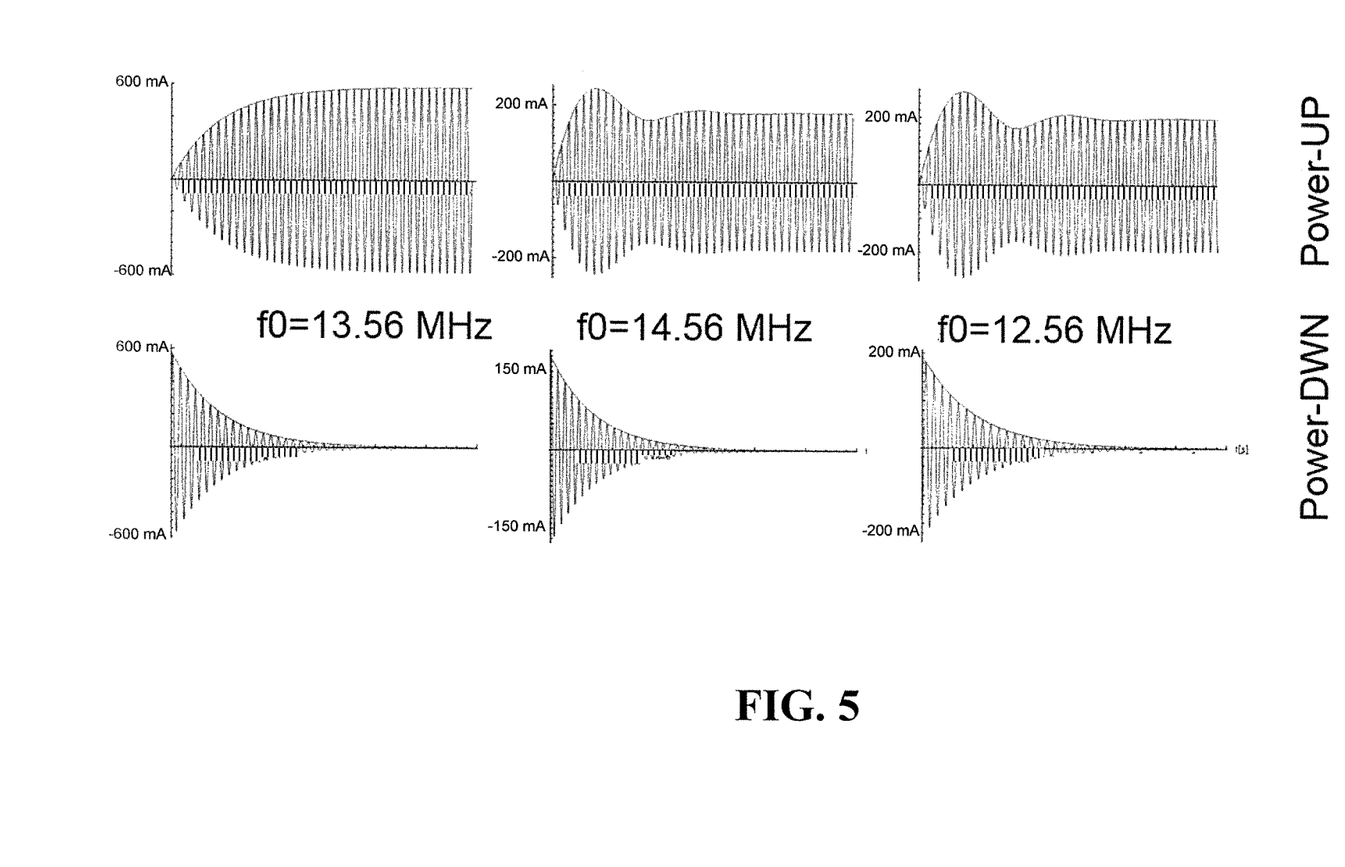
FIG. 5 depicts waveforms showing complex power envelopes for power-on and power-off conditions with different tuning frequencies, consistent with embodiments of the present disclosure.

For a power-off transient (as shown in FIG. 5) the coefficients can be calculated from only two sampled complex envelope points (eA,eB), where the samples are captured early on in the power-off transient. The coefficients W0 and W1 for the power off would then be: W0=eA abd W1=−eB.

While the calculated coefficients represent an estimation that can be further improved once the adaptive feedback equalization path is implemented, experimental test results suggests that the estimation ($W0_{Est}$ and $W1_{Est}$) can be relatively accurate relative to the ideal values ($W0_{True}$ and $W1_{True}$):

$$w0_{True}=0.7399+0.3169i \text{ vs } w0_{Est}=0.7381+0.3111i;$$
and
$$w1_{True}=0.2601-0.3169i \text{ vs } w1_{Est}=0.2619-0.3111i.$$

FIG. 5 depicts waveforms showing complex power envelopes for power-on and power-off conditions with different tuning frequencies, consistent with embodiments of the present disclosure. The horizontal access shows current in the antenna coils, however, a graph of the voltages would show similar results. The leftmost set of graphs show the effect of the channel response when the RF carrier signal frequency is well tuned to the channel. The remaining graphs show the effect of the channel response when the RF carrier signal frequency is increased by one MHz (center graphs) or decreased by one MHz (right most graphs), relative to the same channel. The resulting transient shows that for these poorly tuned examples the complex envelope oscillates about the steady state envelope before settling and that the steady state current is lower.

Figure 6:
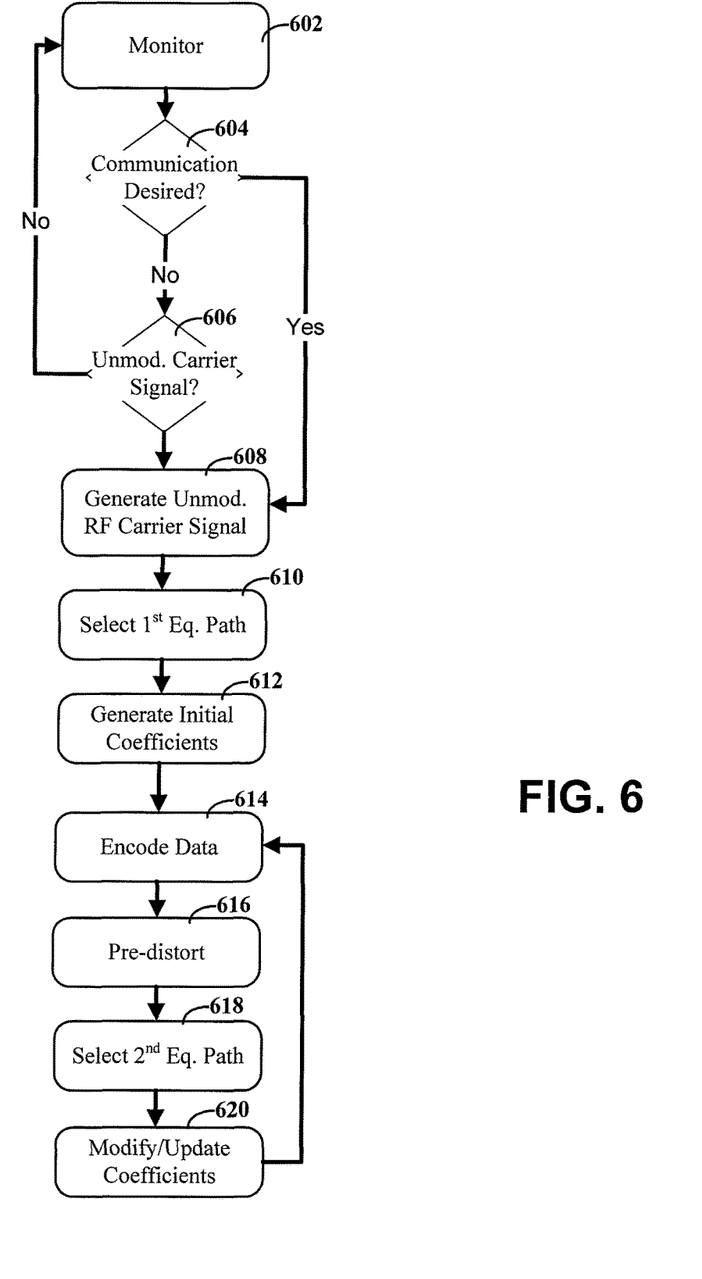
FIG. 6 shows a flow diagram for using both an adaptive feedback equalization path and a presence transition equalization path, consistent with embodiments of the present disclosure.

FIG. 6 shows a flow diagram for using both an adaptive feedback equalization path and a presence transition equalization path, consistent with embodiments of the present disclosure. In certain implementations, a communication device can include a transceiver circuit that is configured to communicate using active-to-active communications. In active-to-active communications, either device can initiate the communications and generate an unmodulated RF carrier signal. Thus, the communication device can monitor for the presence of an unmodulated RF carrier signal, per block 602. If no unmodulated RF carrier signal is detected and the communication device does not have information to communicate, per blocks 606 and 604, respectively, the communication device can continue to monitor, per block 602.

If an unmodulated carrier is detected, then the communication device can be configured to respond by generating an unmodulated RF carrier signal that is transmitted to the other device, per block 608. In this manner, the unmodulated RF carrier signal serves as a type of handshake between the devices. As discussed herein, if the other device detects the presence of a modulated signal, it may halt the handshake process and require that the process be restarted. The use of a training sequence to determine coefficients for a pre-equalizer could therefore disrupt communications. Various embodiments therefore allow for the selection of a $1^{st}$ equalization path, per block 610, that generates initial coefficients, per block 612, based upon the power-on transient caused by the generation of the unmodulated RF carrier signal.

The communication device can then begin encoding and transmitting data to the other device, per block 614. The initial data transmission can use the coefficients from the first equalization path to pre-distort the signal, per block 616. As part of this transmission, the communication device can select a second equalization path that uses the transients associated with the modulation of the RF carrier signal, per block 618. The coefficients can then be modified or updated per block 620. The equalization process that uses the second equalization path can be repeated for as long as data is being transmitted by the communication device.

Various blocks, modules or other circuits may be implemented to carry out one or more of the operations and activities described herein and/or shown in the figures. In these contexts, a "block" (also sometimes "circuit", "logic circuitry", or "module") can be implemented using a circuit that carries out one or more of these or related operations/activities. In various embodiments, a hard-wired control block can be used to minimize the area for such an implementation in case a limited flexibility is sufficient. Alternatively and/or in addition, in certain of the above-discussed embodiments, one or more modules are discreet logic circuits or programmable logic circuits configured and arranged for implementing these operations/activities.

Based upon the above discussion and illustrations, those skilled in the art will readily recognize that various modifications and changes may be made to the various embodiments without strictly following the exemplary embodiments and applications illustrated and described herein. For example, an apparatus can include different modulation schemes and configurations than illustrated by the various Figures. Such modifications do not depart from the true spirit and scope of various aspects of the invention, including aspects set forth in the claims.

What is claimed is:
1. An apparatus comprising:
an antenna configured to transmit a radio frequency (RF) signal across a transmission media having a channel response impairment;
a transmission path that includes:
an encoder circuit that is configured to encode data on an RF carrier signal; and
a pre-equalizer circuit that is configured to pre-distort the encoded data according to equalizer coefficients representing the channel response impairment;
a first equalization path including circuitry that is configured to generate the equalizer coefficients based upon sample values resulting from a power-on event or power-off event for the RF carrier signal;
a second equalization path including circuitry that is configured to generate the equalizer coefficients based upon knowledge of encoded data on the RF carrier signal; and
selection circuitry configured to select between the first equalization path and the second equalization path.

2. The apparatus of claim 1, wherein the power-on event or power-off event for the RF carrier signal corresponds to a power-on event for the RF carrier signal.

3. The apparatus of claim 2, wherein the first equalization path is further configured to generate the equalizer coefficients based upon sampled values for a complex envelope of the RF carrier signal during the power-on event.

4. The apparatus of claim 3, wherein the first equalization path is further configured to calculate each of the equalizer coefficients by subtracting a respectively sampled complex envelope value from a steady state value of the complex envelope.

5. The apparatus of claim 4, wherein the pre-equalizer circuit is further configured to pre-distort according to a first order filter equation with a single zero.

6. The apparatus of claim 1, wherein the power-on event or power-off event for the RF carrier signal corresponds to a power-off event for the RF carrier signal.

7. The apparatus of claim 6, wherein the first equalization path is further configured to calculate each of the equalizer coefficients using respectively sampled complex envelope values.

8. The apparatus of claim 1, wherein the encoder circuit is configured to encode data on the RF carrier signal using quadrature modulation.

9. The apparatus of claim 1, further comprising a down-conversion circuit and an analog-to-digital converter circuit that together are configured to provide a digital baseband signal to both the first equalization path and the second equalization path.

10. A method for transmitting a radio frequency (RF) carrier signal using an antenna, the method comprising:
generating the RF carrier signal;
selecting a first equalization path that captures transients that occur during a presence change event for the RF carrier signal by sampling the RF carrier signal at the antenna;
generating, based upon the sampling of the RF carrier signal, equalizer coefficients that represent a channel response impairment;
encoding data on the RF carrier signal using quadrature modulation;
pre-distorting the encoded data according to the equalizer coefficients;
selecting a second equalization path that modifies the equalizer coefficients based upon a comparison between the encoded RF carrier signal at the antenna and a desired RF carrier signal; and
pre-distorting the encoded data according to the equalizer coefficients as modified by the second equalization path.

11. The method of claim 10, wherein the presence change event for the RF carrier signal corresponds to a power-on event for the RF carrier signal.

12. The method of claim 11, wherein the first equalization path generates the equalizer coefficients based upon sampled values for a complex envelope of the RF carrier signal during the power-on event.

13. The method of claim 12, further comprising calculating each of the equalizer coefficients by subtracting a respectively sampled complex envelope value from a sampled complex envelope value at a steady state.

14. The method of claim 13, wherein the pre-distorting includes the use of a first order filter equation.

15. The method of claim 10, wherein the presence change event for the RF carrier signal corresponds to a power-off event for the RF carrier signal.

16. The method of claim 15, further comprising calculating the equalizer coefficients using respectively sampled complex envelope values.

17. The method of claim 10, wherein generating, based upon the sampling of the RF carrier signal, equalizer coefficients that represent the channel response impairment further includes generating three or more equalizer coefficients.

18. The method of claim 17, wherein the pre-distorting includes the use of a filter equation having an order higher than one.

19. The method of claim 10, wherein the RF carrier signal is designed for use with contactless cards.

20. The method of claim 10, wherein generating the equalizer coefficients further includes sampling values resulting from a power-on event or power-off event for the RF carrier signal.

* * * * *